US011888304B2

United States Patent
D'Angelo et al.

(10) Patent No.: US 11,888,304 B2
(45) Date of Patent: Jan. 30, 2024

(54) CIRCUIT WITH HOT-PLUG PROTECTION, CORRESPONDING ELECTRONIC DEVICE, VEHICLE AND METHOD

(71) Applicant: STMicroelectronics S.r.l., Agrate Brianza (IT)

(72) Inventors: Vittorio D'Angelo, Salerno (IT); Salvatore Cannavacciuolo, Cornaredo (IT); Sergio Lecce, Pavia (IT); Valerio Bendotti, Vilminore di Scalve (IT); Orazio Pennisi, Pieve Emanuele (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 71 days.

(21) Appl. No.: 16/666,989

(22) Filed: Oct. 29, 2019

(65) Prior Publication Data
US 2020/0136366 A1    Apr. 30, 2020

(30) Foreign Application Priority Data

Oct. 31, 2018    (IT) .................. 102018000009947

(51) Int. Cl.
*H02H 1/06*    (2006.01)
*H02H 9/04*    (2006.01)
*H02J 7/00*    (2006.01)

(52) U.S. Cl.
CPC ............ *H02H 1/063* (2013.01); *H02H 9/046* (2013.01); *H02J 7/0014* (2013.01)

(58) Field of Classification Search
CPC ........ H02H 1/063; H02H 9/046; H02H 9/041; H02H 9/005; H02H 9/001; H02H 9/04; H02H 9/025; H02J 7/0014

(Continued)

(56) References Cited

U.S. PATENT DOCUMENTS 5,654,862 A * 8/1997 Worley ............ H03K 17/08104
                                                      361/111
5,734,555 A * 3/1998 McMahon ........... H05K 7/1084
                                                      257/713

(Continued)

FOREIGN PATENT DOCUMENTS

CN    101030575 A    9/2007
CN    101771035 A    7/2010

(Continued)

OTHER PUBLICATIONS

J. C. Bernier, G. D. Croft and W. R. Young, "A process independent ESD design methodology," 1999 IEEE International Symposium on Circuits and Systems (ISCAS), 1999, pp. 218-221 vol. 1, doi: 10.1109/ISCAS.1999.777842 (Year: 1999).*

(Continued)

*Primary Examiner* — Kevin J Comber
*Assistant Examiner* — Sreeya Sreevatsa
(74) *Attorney, Agent, or Firm* — Slater Matsil, LLP

(57) ABSTRACT

An integrated circuit with a hot-plug protection circuit includes input pins and an output pin. The input pins are electrically coupled to a common node in the hot-plug protection circuit via respective electrical connections. The integrated circuit includes clamping circuitry coupled between the common node and the output pin, the clamping circuitry activatable as a result of a voltage spike applied across the clamping circuitry. The plurality of electrical connections and the clamping circuitry provide respective current discharge paths between the input pins in the input pins and the output pin, the respective current discharge paths configured to become conductive as a result of a voltage spike applied to any of the input pins in the plurality of input pins being transferred to the common node via the respective electrical connection in the plurality of electrical (Continued)

connections electrically coupling said any of said input pins to the common node.

20 Claims, 6 Drawing Sheets

(58) Field of Classification Search
USPC .......................................................... 361/56
See application file for complete search history.

(56) References Cited

U.S. PATENT DOCUMENTS

| | | | |
|---|---|---|---|
| 6,501,632 B1* | 12/2002 | Avery | .................... H02H 9/046 |
| | | | 361/111 |
| 9,281,758 B1* | 3/2016 | Wang | .................... H02H 9/001 |
| 2002/0191359 A1* | 12/2002 | Chen | .................... H02H 9/001 |
| | | | 361/58 |
| 2006/0018070 A1 | 1/2006 | Iben | |
| 2009/0161281 A1 | 6/2009 | Maggiolino | |
| 2009/0161282 A1 | 6/2009 | Porter | |
| 2012/0086401 A1* | 4/2012 | Laber | .................... H02J 7/0016 |
| | | | 320/118 |
| 2013/0242449 A1 | 9/2013 | Kato et al. | |
| 2013/0320990 A1* | 12/2013 | Streit | .................... H02J 7/0021 |
| | | | 324/433 |
| 2017/0093151 A1* | 3/2017 | Givelin | .................. H02H 9/046 |
| 2017/0256933 A1 | 9/2017 | Chen et al. | |
| 2018/0149689 A1* | 5/2018 | Ollitrault | ............. G01R 19/257 |

FOREIGN PATENT DOCUMENTS

| | | |
|---|---|---|
| CN | 101938119 A | 1/2011 |
| CN | 102593804 A | 7/2012 |
| CN | 210957785 U | 7/2020 |
| DE | 102013202795 B3 | 3/2014 |
| TW | 201108543 A | 3/2011 |

OTHER PUBLICATIONS

Analog Devices, LTC6813-1, "Multicell Battery Monitor", www.linear.com/LTC6813-1, May 2018, 86 pages.

NXP Semiconductor, "How to Withstand Hot Plug / ESD in MC33771/2", Application Note, Rev 1.0, Oct. 2011, 9 pages.

* cited by examiner

CIRCUIT WITH HOT-PLUG PROTECTION, CORRESPONDING ELECTRONIC DEVICE, VEHICLE AND METHOD

CROSS-REFERENCE TO RELATED APPLICATIONS

This application claims the benefit of Italian Application No. 102018000009947, filed on Oct. 1, 2018, which application is hereby incorporated herein by reference.

TECHNICAL FIELD

The description relates to solutions for protecting circuits, e.g., integrated circuits (ICs), from hot-plug events.

One or more embodiments can be applied to (integrated) circuits for battery management systems (BMS), for instance in the automotive field or in the field of energy storage systems for industrial applications.

BACKGROUND

Generally, the term "hot-plug event" may refer to the abrupt connection ("plug") of one or more pins of a circuit such as an integrated circuit to an electrically charged ("hot") terminal or line.

Generally, hot-plug events are often undesired since they may cause uncontrolled energy transfer from a charged source to the circuit being plugged-in, possibly resulting in damages of the circuit components.

Hot-plug issues may be particularly relevant in battery-supplied electronic systems.

In particular, electric vehicles (EVs) and hybrid electric vehicles (HEVs) may be provided with one or more battery packs comprising a plurality of battery cells. Battery management systems in such electric or hybrid vehicles may comprise a BMS electronic control unit (ECU) which is coupled to the battery pack(s) in order to manage the battery cells.

Managing of the battery cells may comprise, for instance, sensing of the voltage provided at the output of each cell in a battery pack, and/or balancing of the charge stored in the battery cells.

An electronic control unit of a battery management system (BMS ECU) may comprise electrical connections to each cell in a battery pack, with each of these electrical connections being a source of possible hot-plug events that may damage the electronic circuitry in the BMS ECU, in case the inrush energy flowing through the BMS ECU (e.g., the inrush current due to the hot-plug voltage spikes) is not limited by means of some protection circuitry.

Thus, hot-plug issues may particularly affect BMS electronic control units, since each battery cell is a potential source of hot-plug events. For instance, during a vehicle assembly phase, an operator may manually connect each cell of a battery pack to a corresponding pin of a BMS electronic control unit (e.g., via a printed circuit board having the BMS ECU mounted thereon). These pins may thus be coupled to nodes at different voltages, with the voltage increasing along the battery stack.

The connection order of the battery cells to the BMS ECU may be random, so that the number of possible connection sequences may be high. For instance, in a battery pack comprising, say, 14 battery cells, the number of possible connection sequences is notionally equal to 14! (i.e., more than 87 billions).

Under these circumstances, it would be nearly impossible to test the robustness of the BMS ECU against all possible hot-plug scenarios.

In this context, developing robust BMS electronic control units having improved protection against possible hot-plug events is becoming more and more relevant.

Solutions for providing protection of integrated circuits against hot-plug events, without restriction to the specific case of electronic control units for battery management systems, are thus desirable.

SUMMARY

Despite the extensive activity in the area, further improved solutions are desirable.

For instance, solutions are desirable which may provide increased safety of electronic control units and/or integrated circuits at an affordable cost.

Specifically, solutions are desirable which may provide integrated circuits with improved robustness against hot-plug events.

Solutions are desirable which may provide hot-plug protection against every possible cell connection sequence, at an affordable cost.

In particular, such robust solutions may involve a limited number of components external to the integrated circuit, thereby reducing the cost and complexity of a corresponding electronic control unit.

Solutions comprising a limited number of external components may facilitate reducing unwanted current leakage and reducing measurement errors of voltage levels at the pins of an integrated circuit.

An object of one or more embodiments is to contribute in providing such improved solutions.

According to one or more embodiments, such an object can be achieved by means of an integrated circuit having the features set forth in the claims that follow.

One or more embodiments may relate to a corresponding electronic device.

One or more embodiments may relate to a vehicle (for instance, a motor vehicle such as an EV or a HEV) equipped with such an integrated circuit or electronic device.

One or more embodiments may relate to a corresponding method of providing hot-plug protection in an integrated circuit.

The claims are an integral part of the technical teaching provided herein in respect of the embodiments.

One or more embodiments may facilitate providing integrated circuits with integrated hot-plug protection circuits, without involving external components or involving a limited number of external components.

One or more embodiments may facilitate dynamically activating a hot-plug protection circuit included in an integrated circuit, e.g., as a result of a voltage spike being applied at any of the input pins of the integrated circuit.

In one or more embodiments, a hot-plug protection circuit may convey the hot-plug inrush current received from any of the input pins of the integrated circuit towards a single pre-determined output pin, or towards a set of pre-determined output pins. Thus, one or more embodiments may facilitate providing "deterministic" inrush current paths in an integrated circuit.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
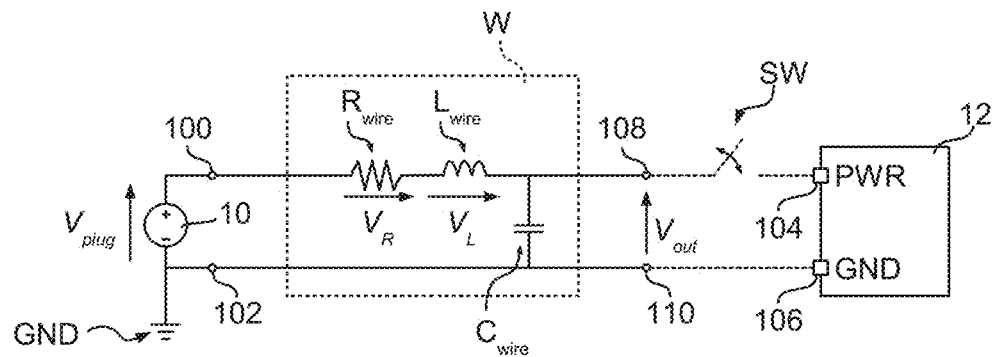
FIG. 1 is a circuit diagram exemplary of an (integrated) circuit supplied by a voltage source.
Figure 2:
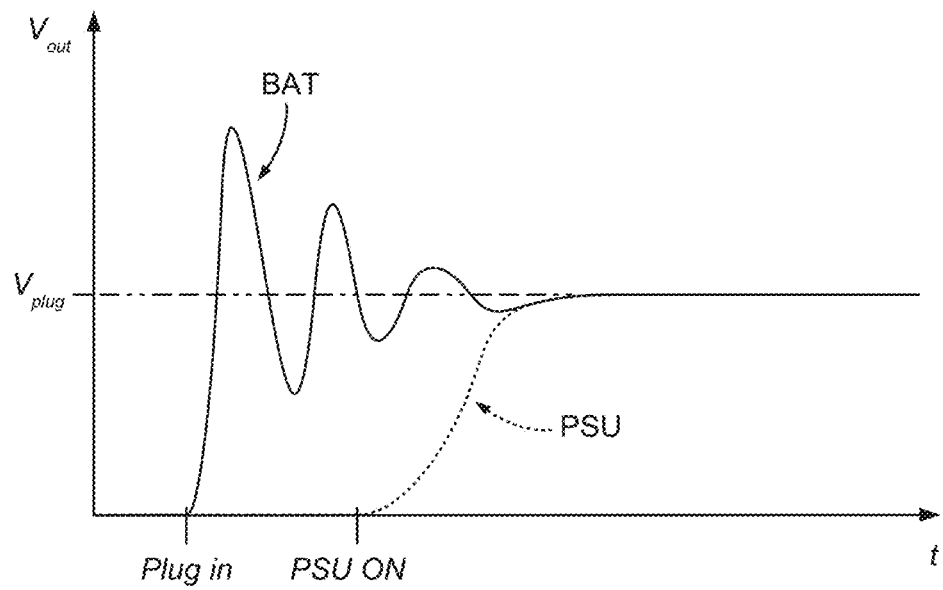
FIG. 2 is exemplary of possible time behavior of signals in the circuit arrangement of FIG. 1.

By way of general introduction to the detailed description of embodiments, one may at first refer to FIGS. 1 and 2.

FIG. 1 is exemplary of a voltage source 10 configured to provide a voltage $V_{plug}$ between two terminals 100 and 102, with the (negative) terminal 102 possibly coupled to a reference (ground) node GND. An integrated circuit 12 as exemplified in FIG. 1 may comprise two input pins 104 and 106 configured to receive a voltage, e.g., a power supply voltage from the voltage source 10, by coupling the (positive) pin 104 to the (positive) terminal 100 and the (negative) pin 106 to the (negative) terminal 102 by means of an electrically conductive line W.

The electrically conductive line W may comprise, for instance, electrical wires and/or electrically conductive lanes on a printed circuit board (PCB).

The electrically conductive line W, which comprises a pair of output terminals 108, no for coupling to the input pins 104, 106 of the integrated circuit 12, may have parasitic components such as a series resistance $R_{wire}$, an inductance $L_{wire}$ and a capacitance $C_{wire}$ as exemplified in FIG. 1.

The electrically conductive line W can be said to be "hot" (i.e., electrically charged) if coupled, at a first end, to the voltage source 10. As a result of the terminal 108 being coupled to the pin 104 and the terminal 110 being coupled to the pin 106 (e.g., by manually implementing such connection, or by operating an electronic switch SW as exemplified in FIG. 1), the voltage $V_{out}$ generated at the output terminals 108, 110 of the electrically conductive line W (and thus at the input pins 104, 106 of the integrated circuit 12) may have voltage spikes. Such spikes of the voltage $V_{out}$ may be due to an impulsive current flowing through the parasitic inductance $L_{wire}$, which generates a certain voltage $V_L$ between the terminals 100 and 108 (neglecting the voltage drop $V_R$ across the parasitic resistance $R_{wire}$) that adds to the voltage $V_{plug}$ according to the following equation:

$$V_{out}=V_{plug}+V_RV_L \approx V_{plug}+V_L >> V_{plug}$$

In certain cases, oscillations of such voltage spikes of the voltage $V_{out}$ may be prolonged as a result of some resonance effect between the inductive and capacitive parasitic components of the electrically conductive line W, and/or between inductors and capacitors physically mounted on the printed circuit board, e.g., for filtering and/or stabilization purposes.

Therefore, the voltage $V_{out}$ provided at the output of the electrically conductive line W (and thus at the input of the integrated circuit 12) may exceed the absolute maximum ratings (AMR) of the integrated circuit 12, possibly resulting in (permanent) damages thereof.

FIG. 2 is exemplary of possible time behaviors of the voltage $V_{out}$ at the output terminals 108,110 of the electrically conductive line W in two different cases.

In a first case (exemplified by the dotted curve in FIG. 2), the voltage source 10 is a controllable power supply unit (PSU), which can be plugged in without generating voltage spikes at the input pins 104, 106 of the integrated circuit 12, since the slope of the output voltage $V_{out}$ can be controlled (e.g., limited) by the output current capability of the power supply unit.

In a second case (exemplified by the solid curve in FIG. 2), the voltage source 10 is a battery (BAT). Batteries may be always "hot", i.e., able to provide a certain voltage $V_{plug}$ between the terminals 100 and 102, and may have a large output current capability. Therefore, voltage spikes may be generated at the terminals 108, 110 as soon as a battery is plugged in, i.e., coupled to the integrated circuit 12 via the electrically conductive line W.

As noted, hot-plug issues may therefore be particularly relevant in battery-supplied electronic systems, e.g., electronic systems in electric vehicles and hybrid electric vehicles provided with battery packs comprising a plurality of battery cells. Battery management systems in such kind of vehicles may comprise a BMS electronic control unit which is coupled to the battery pack in order to manage the battery cells. The BMS ECU may comprise electrical connections to each cell in the battery pack, with each of these electrical connections being a source of possible hot-plug events that may damage the electronic circuitry in the BMS ECU, in case the inrush energy flowing through the BMS ECU (e.g., the inrush current due to the hot-plug voltage spikes) is not limited by means of some protection circuitry.

Figure 3:
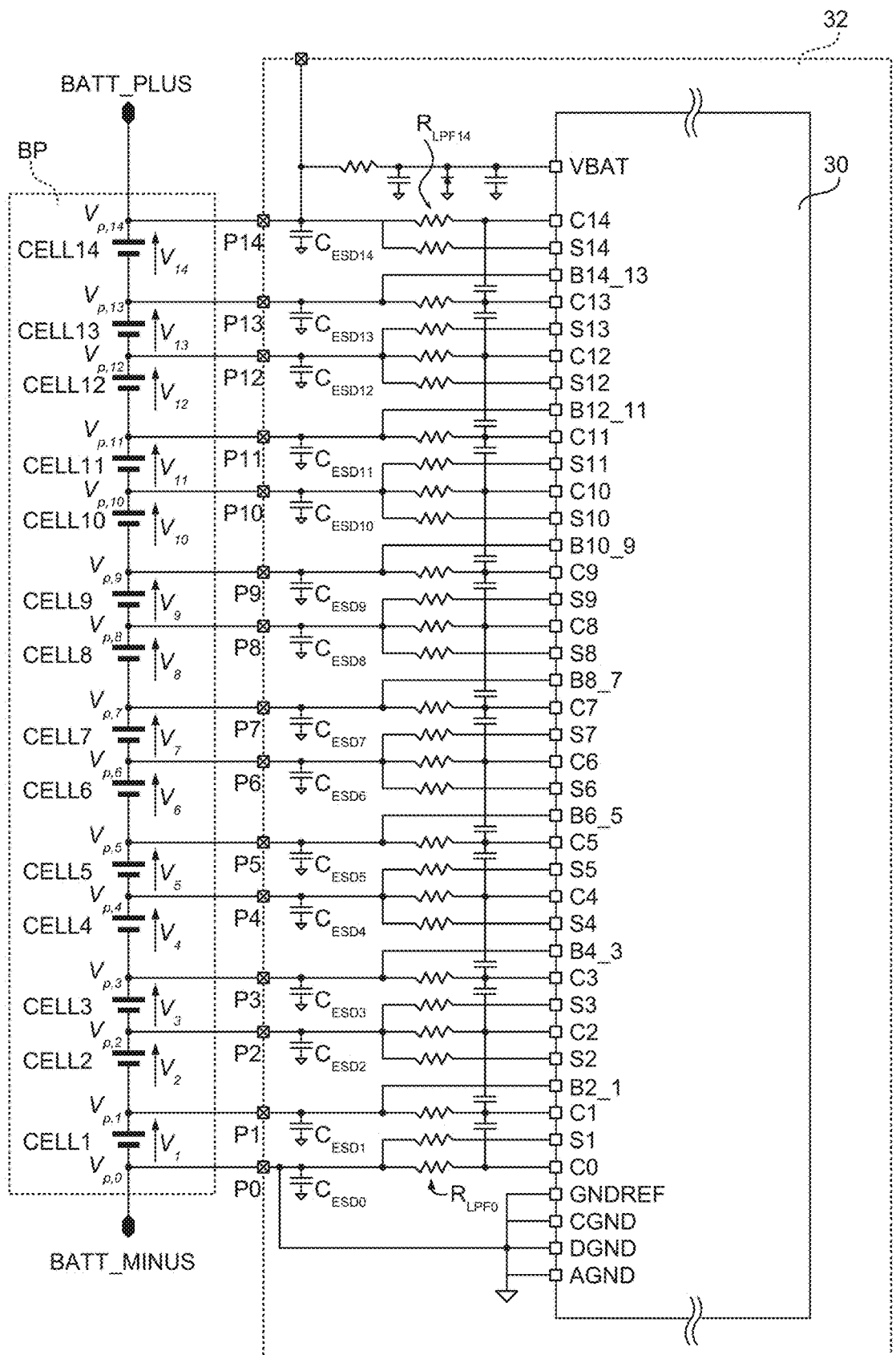
FIG. 3 is a circuit diagram exemplary of a possible context of use of one or more embodiments.

For instance, FIG. 3 is exemplary of a battery pack BP comprising a plurality of battery cells (indicated as CELL1, . . . , CELL14) coupled in series between a (negative) terminal BATT_MINUS and a (positive) terminal BATT_PLUS. As a result of the battery cells CELL1, ..., CELL14 being coupled in series and providing respective voltages $V_1, \ldots, V_{14}$, the nodes intermediate each pair of cells are configured to provide voltage levels $V_{p,i}$ (with i=0, ..., 14) which increase from $V_{p,0}=V_{BATT\_MINUS}$ to $V_{p,14}=V_{BATT\_PLUS}$.

It will be understood that each of the battery cells CELL1, ..., CELL14 shown in FIG. 3 may comprise a single cell or a plurality of cells coupled in parallel.

A battery management system may comprise an electronic control unit 30 configured to manage the battery pack BP in a manner known per se. The electronic control unit 30 may be implemented as an integrated circuit having a plurality of input pins and/or output pins (see, for instance, the pins C0, ..., C14 and/or S1, ..., S14 and/or B2_1, ..., B14_13 in FIG. 3), the integrated circuit being possibly mounted on a printed circuit board 32 having a respective plurality of input pins and/or output pins (see, for instance, the pins P0, ..., P14 in FIG. 3).

As exemplified in FIG. 3, the pins of the electronic control unit 30 may be coupled to the pins of the printed circuit board 32 via resistive and/or capacitive elements, e.g., in order to realize a low-pass filtering of the voltage signals $V_{p,0}, \ldots, V_{p,14}$ sensed at the pins P0, ..., P14. The pins of the printed circuit board 32 may be coupled to respective terminals in the stack comprising the battery cells CELL1, ..., CELL14.

Both the electronic control unit 30 and the printed circuit board 32 may have other pins/pads not visible in the Figures annexed herein, and the electrical connections illustrated herein are provided by way of example only.

As discussed previously:
hot-plug issues may be particularly relevant for BMS electronic control units, since each battery cell is a potential source of hot-plug events,
the connection order of the battery cells to the BMS PCB 32 may be random, which may result in a very high number of possible connection sequences and make it nearly impossible to test the robustness of the BMS ECU against all possible hot-plug scenarios; and
developing robust BMS electronic control units having improved protection against possible hot-plug events is a desirable goal to be pursued.

One or more embodiments may thus relate to solutions which facilitate protection of integrated circuits against hot-plug events, without restriction to the specific case of electronic control units for battery management systems.

In that respect it is noted that, according to a solution well known to those of skill in the art, integrated circuits may be provided with internal electrostatic discharge (ESD) clamp circuits (not visible in FIG. 3).

Such ESD clamp circuits may be designed in order to be activated as a result of the voltage and/or current values at the pins of the integrated circuit violating the absolute maximum ratings (AMR) of the integrated circuit, with such approach being generally referred to as "static ESD clamp".

Additionally or alternatively, the ESD clamp circuits may be designed in order to be activated as a result of the voltage and/or current values at the pins of the integrated circuit having variations (e.g., rising or falling) over time with a slope that is higher than a certain threshold, with such approach being generally referred to as "dynamic ESD clamp".

An example of ESD clamp circuit is a circuit that becomes conductive between a first pin and a second pin of an integrated circuit as a result of the voltage applied between a certain pair of pins (the certain pair of pins comprising at least one of said first pin and second pin) being higher than a certain threshold.

In case a voltage spike is applied at a certain pair of input pins of an integrated circuit due to a hot-plug event, it is likely that the absolute maximum ratings of the IC will be violated, thereby activating the internal ESD clamp circuits. However, it is noted that such ESD clamp circuits may not be designed to withstand a high power for a time interval longer than a few hundreds of nanoseconds (1 ns=$10^{-9}$ s).

In case of a hot-plug event, a certain inrush current (possibly having a high magnitude) may flow through the integrated circuit between a first pin and a second pin during a transient phase. Such inrush current may flow through different conductive paths inside and outside the integrated circuit depending on the architecture of the internal ESD clamp circuits.

The transient phase may involve charging capacitances internal to the integrated circuit 30 (e.g., substrate capacitances) and/or external to the integrated circuit 30 (e.g., differential filtering capacitors coupled between pairs of pins C0, ..., C14 or ESD capacitors $C_{ESD0}, \ldots, C_{ESD14}$). Due to the external capacitances being generally higher than the internal ones, the transient phase may be dominated by such external capacitances, with the duration of the transient phase mainly depending on the magnitude of the external capacitances (e.g., in the range of some tens or hundreds of nF, with 1 nF=$10^{-9}$ F).

As a result of the ESD clamp circuits internal to the integrated circuit 30 being generally designed for withstanding short-lasting transient phases, an inrush current flowing through a conductive path involving at least one of the external capacitances may have a duration which exceeds the limits of the ESD clamp circuits, thus resulting in a relevant probability of generating damages thereof.

After the transient, the capacitors $C_{ESD0}, \ldots, C_{ESD14}$ coupled to the respective pins P0, ..., P14 (also referred to as "ESD capacitors" in the following) may be charged to respective voltage levels, with such voltage levels depending on the cell voltages $V_1, \ldots, V_{14}$, wherein typically the pin voltage increases along the battery stack, i.e. $V_{p,i}<V_{p,i+1}$. In the context of the present description, designations $V_1, \ldots, V_{14}$ refer to the cell voltages, understood as the (differential) voltage drop across each of the cells CELL1, CELL14, while designations $V_{p,0}, \ldots, V_{p,14}$ refer to the (absolute) voltages at pins P0, ..., P14, i.e. $V_i=V_{p,i}-V_{p,i-1}$.

The voltage levels reached by the capacitors $C_{ESD0}$, $C_{ESD14}$ may also depend on the charging path, the charging path comprising both external analog front end and internal components of the integrated circuit.

With such voltage levels being possibly simulated and/or analytically estimated, the energy $E_i$ (with i=0, ..., 14) transferred to a certain node for charging a certain ESD capacitor may be computed according to the following equation:

$$E_i = \tfrac{1}{2} \cdot C_{ESDi} \cdot V_{p,i}^2$$

Thus, the "higher" is the battery cell in the battery stack, the higher would be the inrush current involved in the charging phase of the corresponding ESD capacitor. However, this has to be understood as a simplified, exemplary case. Generally, the connection of any of the pins P0, ..., P14 of the PCB 32 to the respective battery cell may generate voltage levels at the pins of the integrated circuit 30 which may activate various ESD current paths.

This may result in restrictions on the possible connection orders of the battery cells, which is disadvantageous since the operators performing the connections should be instructed to insert the battery cells one by one, e.g. starting from the lowest in the stack up to the topmost, with a resulting lengthy and complex assembly procedure which is prone to possible errors.

It is also noted that the energy $E_i$ depends on the value of capacitance $C_{ESi}$, so that the higher is the capacitance $C_{ESDi}$, the higher is the energy $E_i$. Thus, the value of the capacitance $C_{ESDi}$ may be limited in order to limit the inrush current, with the drawback of limiting the filtering capability of the input circuitry associated to the electronic control unit 30.

It is noted that the transient duration may depend on the time constant(s) of the resistive and capacitive network between the PCB pins P0, ..., P14 and the ECU pins, and on the ESD current path(s) which is/are activated in the integrated circuit 30, thus resulting in an often hardly predictable transient duration. Typical values of the transient duration are about 10 μs (1 μs=$10^{-6}$ s), which is much higher than the maximum allowed activation time for the internal ESD clamp circuits of the integrated circuit 30.

In known solutions, differential ESD clamp circuits internal to an integrated circuit may be configured to limit the voltage between any pair of pins of the integrated circuit to a certain value within the absolute maximum ratings of the IC (e.g., 8 V or 6 V). The ESD clamp circuits internal to the integrated circuit may comprise a plurality of diodes, e.g. Zener diodes, arranged in an ESD network.

As a result of a hot-plug event at a certain pair of pins, inductive voltage spikes may activate such ESD network. The amount of energy to be sustained by the ESD clamp circuits may depend on the capacitance of the ESD capacitors $C_{ESDi}$ coupled to the PCB pin P0, ..., P14. An inrush current may flow through the ESD clamp circuits across a plurality of different conductive paths, with such inrush current being possibly dangerous for the ESD clamp circuits themselves.

In such known solutions, diodes external to the integrated circuit (e.g., 6.8 V Zener diodes) may be coupled in parallel to the internal ones, e.g. between subsequent pins of the integrated circuit configured to be coupled to increasing voltage values. For instance, with reference to FIG. 3, a Zener diode may be coupled externally to the electronic control unit 30 (e.g., on the PCB 32) between each pair of subsequent pins C0, ..., C14 the Zener diodes having the anode coupled to the pin at the lower voltage and the cathode coupled to the pin at the higher voltage.

Such external Zener diodes may facilitate deviating the hot-plug energy (i.e., the inrush current generated as a result of a hot-plug event) outside of the integrated circuit, thereby providing improved protection against hot-plug events.

In this context, the inventors have noted that known solutions for protecting integrated circuits against hot-plug events involve a certain number of Zener diodes coupled externally to the IC (e.g., in parallel to battery cells) in order to deviate the possible hot-plug energy outside of the IC.

The inventors have noted that such external Zener diodes may generate additional current leakage paths, which may negatively affect the precision of the pin voltage measurement (i.e., the measurement of the voltage levels $V_{p,0}, \ldots, V_{p,14}$) in case the leakage current flows thorough the low-pass filter resistors $R_{LPF0}, \ldots, R_{LPF14}$ coupled between the PCB pins P0, ..., P14 and the respective ECU pins C0, ..., C14.

For instance, a current leakage of 2 μA across two resistors $R_{LPF}$ of 1 kΩ would generate an offset error of 4 mV on the measured cell voltage, which may not be compatible with the system requirements. Reducing the resistance of the low-pass filter resistors may reduce the offset error on the measured cell voltage, but the at the expense of worsening the filtering capabilities.

Additionally, the external Zener diodes may require a certain amount of space on the printed circuit board 32, thereby increasing the cost and complexity of the device.

The inventors have also noted that it may be almost impossible to test the robustness of an integrated circuit according to the known solutions against all possible cell insertion orders, e.g. in case the battery stack comprises 14 battery cells. Therefore, known solutions may not provide any certification of hot-plug withstanding capability.

In this context, one or more embodiments of the present disclosure may provide improved solutions for protecting integrated circuits against hot-plug events.

Figure 4A:
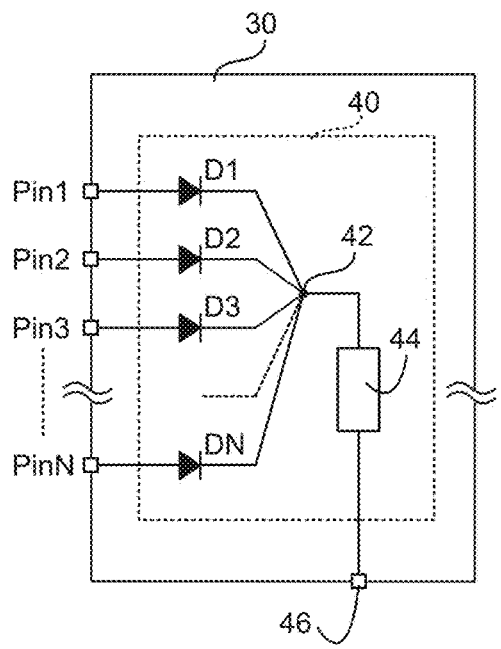
FIG. 4A is a block diagram exemplary of a clamp circuit in one or more embodiments.

FIG. 4A is exemplary of an integrated circuit, e.g. an electronic control unit 30, having a plurality of input/output pins Pin1, Pin2, Pin3, ..., PinN possibly couplable to "hot" terminals (i.e., terminals possibly subject to hot-plug events). The electronic control unit 30 is provided with an ESD clamp circuit 40.

In one or more embodiments, the ESD clamp circuit 40 may be integrated within the electronic control unit 30, without involving external components such as Zener diodes to be coupled between pairs of pins of the electronic control unit 30.

In one or more embodiments, the ESD clamp circuit 40 may be dynamic, insofar as it may be activated (e.g., triggered) by a voltage spike being sensed at any of the pins Pin1, ..., PinN as a result of a hot-plug event taking place at any of the pins Pin1, ..., PinN.

In one or more embodiments, the ESD clamp circuit 40 may be centralized, insofar as it may convey the hot-plug energy (e.g., the hot-plug current) received from any of the pins Pin1, ..., PinN towards a single pre-determined output pin 46, or towards a set of pre-determined output pins (not visible in the Figures annexed herein).

In one or more embodiments, an ESD clamp circuit 40 may provide deterministic inrush current paths, thereby facilitating predicting the path that an inrush current may follow, for any possible hot-plug event (i.e., for any possible connection sequence of the pins Pin1, ..., PinN).

Thus, one or more embodiments may provide an integrated, dynamic and centralized ESD clamp circuit 40.

In one or more embodiments, the static component of an ESD clamp circuit 40 may be higher than the operating voltage which is sensed at the pins Pin1, ..., PinN in normal operating conditions of the electronic control unit 30. The static component of the ESD clamp circuit 40 may relate to the absolute maximum ratings (AMR) of the electrical component(s) (e.g., 44) comprised in the ESD clamp circuit 40, and may refer to any signal (static or variable) which does not result in a dynamic activation of the ESD clamp circuit.

For instance, the ESD clamp circuit 40 may be designed so to withstand a voltage level equal to the highest voltage level possibly applied to any of the pins Pin1, ..., PinN in normal operating conditions.

In one or more embodiments, the break-point of an ESD clamp circuit 40 may be pre-determined and easily designable, with the break-point corresponding to a certain value of maximum current flowing through the ESD clamp circuit 40 and a certain value of maximum voltage across the ESD clamp circuit 40 which would result in failure of the ESD clamp circuit 40.

Therefore, in one or more embodiments, an ESD clamp circuit 40 integrated in an electronic control unit 30 may be configured to:
- be coupled to the pins Pin1, . . . , PinN of the electronic control unit 30 which may be subject to hot-plug events;
- be triggered, thereby becoming conductive, as a result of a voltage spike being sensed at any of the pins Pin1, . . . , PinN coupled thereto;
- provide one or more pre-determined current paths between the pins Pin1, . . . , PinN and at least one pre-determined output pin 46 of the electronic control unit 30.

Additionally, an ESD clamp circuit 40 integrated in an electronic control unit 30 may be configured to have a static component higher than the operating voltage which is present at the pins Pin1, . . . , PinN during normal operation of the electronic control unit 30, and/or to have a pre-determined break-point.

With reference to FIG. 4A, an exemplary ESD clamp circuit 40 according to one or more embodiments may thus comprise:
- respective diodes D1, . . . , DN coupled to each of the pins Pin1, . . . , PinN of the electronic control unit 30 possibly subject to hot-plug events, the diodes being coupled between the respective pins Pin1, . . . , PinN and a common node 42, e.g. having respective anodes coupled to the respective pins Pin1, . . . , PinN and respective cathodes coupled to the common node 42, and
- clamping circuitry 44 coupled between the common node 42 and an output pin 46 of the electronic control unit 30.

For instance, in one or more embodiments, the device available with the trade designation L9963 with companies of the STMicroelectronics Group may be exemplary of a conventional arrangement for such an electronic control unit 30.

Figure 4B:
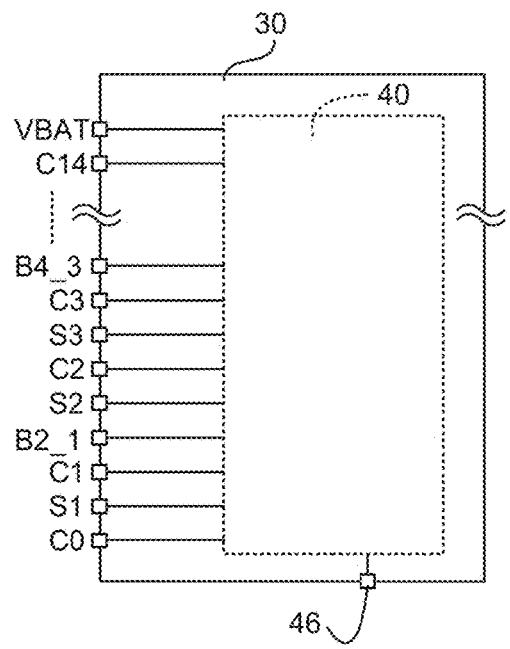
FIG. 4B is exemplary of possible electrical connections of a clamp circuit in one or more embodiments.

In one or more embodiments, the electronic control unit 30 may comprise an integrated circuit 30 as exemplified in FIG. 3, configured to be coupled to a battery pack BP comprising a set of battery cells, e.g. 14 battery cells. Thus, the set of pins Pin1, PinN may comprise the pins C0, . . . , C14 and/or S1, . . . , S14 and/or B2_1, . . . , B14_13, as well as the pin $V_{BAT}$, as exemplified in FIG. 4B, and possibly other pins not visible in the annexed Figures.

In particular, the pins of the electronic control unit 30 may be configured as discussed in the following.

The pin VBAT may be configured to provide power supply to the electronic control unit 30, usually corresponding to the positive terminal of the topmost battery cell in the battery pack (e.g., $V_{p,14} = V_{BATT\_PLUS}$);

Pins Ci may be configured to sense the voltage $V_{p,i}$ at the corresponding battery cell CELLi by coupling to the positive terminal of the battery cell CELLi. The cell voltage $V_i$ is sensed by performing a differential measurement between pins Ci and Ci−1, the latter being coupled to the negative terminal of battery cell CELLi and, in addition, to the positive terminal of the battery cell CELLi−1 (with the exception of pins C14 and C0, which may not share their connection with two cells).

Pins Si may be configured as battery cell FET (Field Effect Transistor) control output of the corresponding battery cell CELLi, i.e., as switches activating a respective conduction path involving battery cell CELLi.

Pins Bi_i−1 may be configured as common terminals connected between the two switches insisting on pins Si and Si−1.

In one or more embodiments, the pins Si and Bi_i−1 may be used for balancing purposes, namely for discharging battery cells which are detected to be "too charged" in order to equalize the distribution of charge over all the battery cells. The equalization process may be defined "passive" if the charge subtracted from a more charged cells is dissipated on a resistor (which may be either internal or external to the integrated circuit 30). Conversely, the equalization may be defined "active" if the charge subtracted from a more charged cell is transferred to a less charged one by means of non-resistive internal or external components. In both cases, pins Si and Bi_i−1 may provide the capability of acting as switches for the actuation of the balancing process. A possible implementation of such switches is by means of Field Effect Transistors (FETs).

Figure 5A:
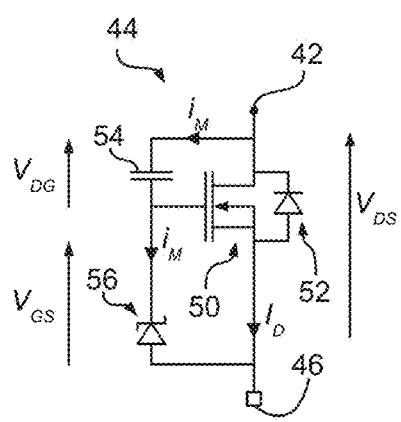
FIG. 5A is exemplary of possible implementation details of one or more embodiments.

Several implementations of the clamping circuitry 44 are possible. For instance, FIG. 5A is exemplary of one or more embodiments wherein the clamping circuitry 44 is implemented with a gate-coupled MOS transistor 50 having the current path between the node 42 and the output pin 46, e.g. having the drain coupled to the node 42 and the source coupled to the output pin 46.

The MOS transistor 50 may comprise a body diode 52 coupled between the source terminal and the drain terminal. It will be understood that the body diode 52 is explicitly illustrated in FIG. 5A for the sake of easier comprehension only, while the diode 52 may be inherently present in the transistor 50.

The clamping circuitry 44 may comprise a so-called Miller capacitance 54 coupled between the drain terminal and the gate terminal of the MOS transistor 50. Such Miller capacitance 54 may be a parasitic component of the MOS transistor 50 (thus illustrated in FIG. 5A as a separate element for the sake of easier comprehension only), or may be a physical component intentionally realized as a separate element from the MOS transistor 50.

In one or more embodiments, the clamping circuitry 44 may comprise a component for forcing the clamping circuitry 44 to operate at a certain (pre-defined) working point in case the clamping circuitry is activated. For instance, a Zener diode 50 connected between the gate terminal and the source terminal of the MOS transistor 50, e.g. having the anode coupled to the source terminal and the cathode coupled to the gate terminal of the MOS transistor 50, may provide such "forcing" function by clamping the gate-source voltage of the MOS transistor 50.

In one or more embodiment, the static component of the ESD clamp circuit 40 may be a function of the drain-source breakdown voltage of the MOS transistor 50. For instance, a MOS transistor 50 having a breakdown voltage of about 80 V (e.g., in the range 72-88 V) may be selected, thereby resulting in a static component of the ESD clamp circuit 40 approximately equal to 8 V (e.g., in the range 72-88 V).

Generally, the static component of the ESD clamp circuit 40 may be designed so the be higher than the maximum operating voltage applied to the ESD clamp circuit 40 in normal operating conditions, which may depend, e.g., on the number of battery cells in the battery pack BP.

In one or more embodiments, the ESD clamp circuit 40 may be dynamically activated by a hot-plug event and/or an ESD event at any of the pins Pin1, . . . , PinN. As a result of a voltage spike taking place at any of the pins Pin1, . . . , PinN, the drain-source voltage VDS of the MOS transistor 50 (which may be initially OFF) may have a corresponding voltage spike, thereby resulting in a current flowing between the node 42 and the output pin 46 through the current discharge path provided by the Miller capacitance 54 and the Zener diode 56 coupled in series.

The value of the capacitance 54 may be designed so to make the ESD clamp circuit 40 sensitive (e.g., activatable) to time-variations of the drain-source voltage $V_{DS}$ which are greater than a certain threshold value, e.g. 25 V/μs.

In one or more embodiments, the MOS transistor 50 may be forced to operate with a certain value of gate-source voltage, e.g. 5 V, by means of the Zener diode 56. Therefore, a current $i_M$ flowing through the capacitance 54 and the Zener diode 56 may be computed according to the following equation:

$$i_M = C_M \cdot \frac{dV_{DG}}{dt} = C_M \cdot \left(\frac{dV_{DS}}{dt} - \frac{dV_{GS}}{dt}\right)\bigg|_{V_{GS}=5V} = C_M \cdot \frac{dV_{DS}}{dt}$$

wherein $C_M$ is the capacitance of the Miller capacitance 54, $V_{DG}$ is the drain-gate voltage of the MOS transistor 50, and $V_{GS}$ is the gate-source voltage of the MOS transistor 50, being clamped by the Zener diode 56.

Therefore, in one or more embodiments, the value of the current $i_M$ may depend on the variation rate of the voltage $V_{DS}$ across the clamping circuitry 44, thereby providing the possibility of dynamically activating the ESD clamp circuit 40.

In one or more embodiments, an ESD clamp circuit 40 may thus be configured to provide a current path for inrush currents due to hot-plug events between any of the pins Pin1, . . . , PinN and at least one output pin 46 of the electronic control unit 30, with the at least one output pin 46 possibly being coupled (directly or indirectly) to a (ground) reference terminal of the printed circuit board 32.

Figure 5B:
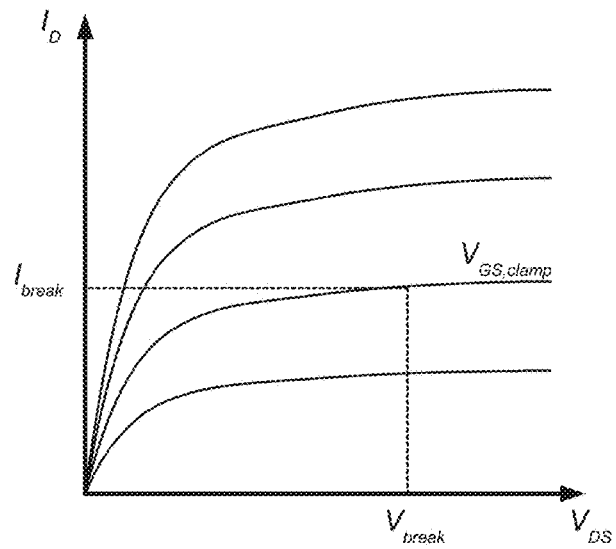
FIG. 5B is exemplary of possible operating details of one or more embodiments.

In one or more embodiments, the MOS transistor 50 being forced to operate at a certain value of gate-source voltage by means of the Zener diode 56 may also provide a way of designing a pre-determined break-point of the ESD clamp circuit 40, as exemplified in FIG. 5B, wherein the break-point may be identified as a pair of values ($I_{break}$; $V_{break}$) of current and voltage applied to the MOS transistor 50 for that certain value of gate-source voltage $V_{GS,clamp}$.

For instance, in one or more embodiments, $V_{GS,clamp}$ may be approximately equal to 5 V, resulting in $V_{break}$ being approximately equal to 65 V and $I_{break}$ being approximately equal to 3A. Such values may vary depending on the application and/or on the design of the clamping circuitry 44.

Figure 6:
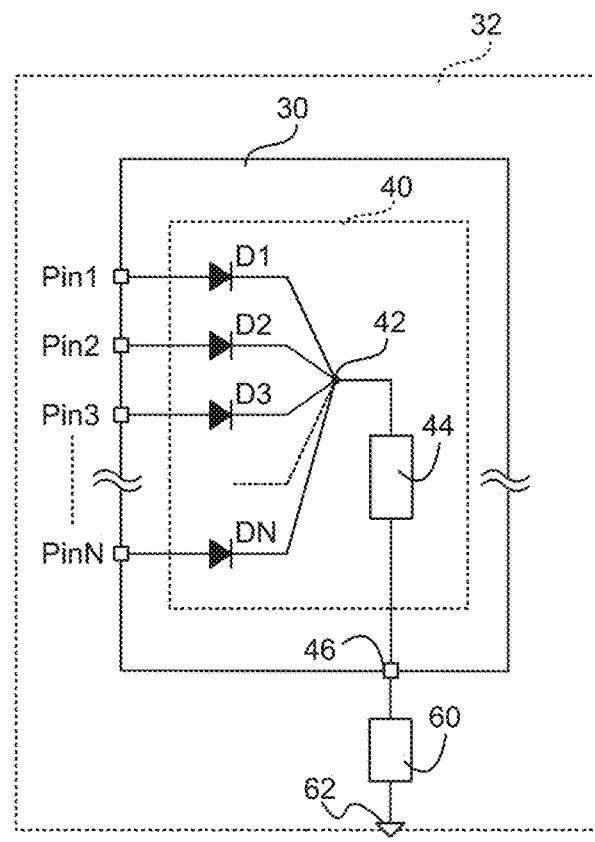
FIG. 6 is a block diagram exemplary of a clamp circuit in one or more embodiments.

In one or more embodiments, an ESD clamp circuit 40 as described above may be configured to co-operate with an (external) power limiting circuit 60, as exemplified in FIG. 6. The power limiting circuit 60 may be implemented, for instance, as a circuit on the printed circuit board 32, external to the electronic control unit 30.

A power limiting circuit 60 according to one or more embodiments may limit the power (e.g., the current) flowing through the ESD clamp circuit 40 coupled thereto, in order to keep such power below the break-point of the ESD clamp circuit 40. In one or more embodiments, a power limiting circuit 60 may be coupled between the at least one output pin 46 of the electronic control unit 30 and a reference pin 62 of the printed circuit board 32, the reference pin 62 being in turn possibly coupled with a power rail or a ground rail of the electronic system, e.g. a battery management system, comprising the printed circuit board 32.

In particular, a power limiting circuit 60 may be configured to provide a high-impedance current path between the output pin 46 and the reference pin 62. In case a hot-plug event occurs at any of the pins Pin1, . . . , PinN of the ECU 30, the resulting inrush current may thus be deviated by means of the ESD clamp circuit 40 through said high-impedance path, whose impedance value may be sized taking into account the break-point of the ESD clamp circuit 40. For instance, a worst-case may be considered, and the impedance value of the high-impedance path may be chosen in order to limit the magnitude of the inrush current below the break-point current $I_{break}$ of the ESD clamp circuit 40.

Just by way of example, such worst-case analysis for the dimensioning of a high-impedance path in the power limiting circuit 60 may comprise the following steps labeled a) to d).

a) Take into consideration the highest voltage value $V_{plug}$ which may be provided by a voltage source 10 in the considered application. For instance, in case the voltage source 10 is a battery pack with 14 battery cells, with each of the cells being able to provide a maximum output voltage of approximately 4.2 V, the highest value of $V_{plug}$ possibly provided between terminals 100 and 102 may be approximately equal to 14*4.2 V=58.8 V.

b) Take into consideration the effect of the electrically conductive line W, which may result in a voltage $V_{out}$ between terminals 108 and 110 having spikes as exemplified in FIG. 2, thus resulting in $V_{out}>V_{plug}$. Expected values of $V_{out}$ may be computed as a function of typical values of $V_{plug}$, $R_{wire}$, $L_{wire}$ and $C_{wire}$ for the considered application. For instance, if a hot-plug event takes place by coupling the voltage source 10 to the circuit 12 by means of a copper wire 20AWG (American Wire Gauge), 4 ft long, typical values may be $R_{wire}$=40 mΩ and $L_{wire}$=2 μH. In some cases, in place of the capacitance $C_{wire}$ may be considered the input capacitance of the pin which is being connected to the electrically conductive line W (e.g., one of the capacitances $C_{ESD0}$, $C_{ESD14}$ exemplified in FIG. 3). With exemplary values of the capacitances $C_{ESD0}$, . . . , $C_{ESD014}$ being approximately 47 nF, and considering a slope of 100 V/μs for the input signal $V_{plug}$, a maximum value $V_{out,max}$ of about 110 V of the signal $V_{out}$ may be computed.

c) Assume that such signal $V_{out}$ is entirely applied to the series-connected clamping circuitry 44 and power limiting circuit 60, i.e. between nodes 42 and 62, neglecting any possible voltage drop between the pins P0, . . . , P14 and the input pins Pin1, PinN of the integrated circuit 30.

d) Take into consideration the break-point ($I_{break}$; $V_{break}$) of the ESD clamp circuit 40, and compute a value of impedance for the high-impedance path in the power limiting circuit 60 so that the current flowing between nodes 42 and 62 during a hot-plug event is lower than $I_{break}$. For instance, considering (as an example) $I_{break}$=3 A, then the value of impedance for the high-impedance path may be computed to be around $V_{out,max}/I_{break}$=110 V/3 A=36.6Ω.

As noted, the impedance value of the high-impedance path may be sized according to any suitable design analysis, with the worst-case procedure discussed above being purely exemplary.

Additionally, in one or more embodiments, a power limiting circuit 60 may provide a selectively activatable low-impedance current path between the output pin 46 and the reference pin 62, i.e. in parallel to the high-impedance current path, so as to facilitate bypassing the high-impedance current path during normal operation of the BMS ECU 30. Providing such low-impedance current path may be advantageous in that it avoids introducing a high-impedance current path in series with a power rail and/or a ground rail during normal operation of the BMS ECU, which is undesirable in many applications.

In one or more embodiments, the components comprised in the power limiting circuit 60 may be designed and/or sized in order to withstand inrush currents generated by hot-plug events, with reduced risk of damage thereof.

Figure 7:
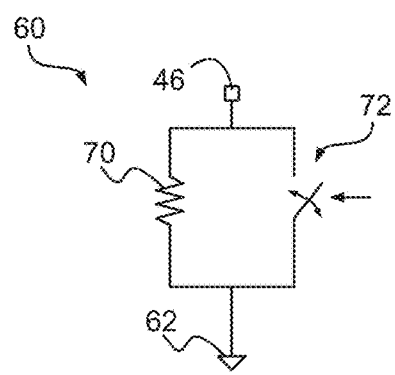
FIGS. 7 and 8 are exemplary of possible implementation details of one or more embodiments.

For instance, FIG. 7 is a circuit diagram exemplary of a possible architecture of a power limiting circuit 60, comprising a high-impedance element 70, in particular a high-impedance resistor, between the pins 46 and 62, and a low-impedance current path in parallel to the high-impedance element 70, the low-impedance current path being activatable (i.e., possibly made conductive) by means of an electronic switch 72.

It will be understood that different components may be used for implementing the high-impedance element 70 and the electronic switch 72, without departing from the scope of the present invention.

In one or more embodiments, as a result of the electronic system (or, more specifically, the battery management system) comprising the ECU 30 operating in normal conditions, the ESD clamp circuit 40 may be inactive. The output pin 46 of the electronic control unit 30 may act as a reference pin for the ECU, with the internal polarization current(s) of the ECU 30 flowing through the output pin 46 of the ECU 30 towards the reference pin 62 of the PCB through the low-impedance current path provided in the power limiting circuit 60. Therefore, the electronic switch 72 may be conductive during normal operation of the ECU 30.

In one or more embodiments, as a result of the electronic system (or, more specifically, the battery management system) comprising the ECU 30 not operating in normal conditions (e.g., being handled by an assembly operator during an assembly phase), the polarization circuitry internal to the ECU 30 (not visible in the Figures annexed herein) may be inactive and the ESD clamp circuit 40 may be sensitive to possible hot-plug events. As a result of a hot-plug event happening, the output pin 46 of the electronic control unit 30 may act as a clamp rail output pin of the ECU, with the hot-plug inrush current(s) flowing through the ESD clamp circuit 40 to the output pin 46 of the ECU, then towards the reference pin 62 of the PCB through the high-impedance current path provided in the power limiting circuit 60. The high-impedance current path may be designed and/or sized in order to limit the magnitude of the inrush current. Therefore, the electronic switch 72 may be non-conductive when the ECU 30 is not operating in normal conditions.

In one or more embodiments, the electronic switch 72 may be implemented as a transistor, in particular a MOS transistor (e.g., an n-type MOS transistor), or a BJT transistor (e.g., an NPN BJT transistor) working in saturation region, i.e. with a high base polarization current.

Figure 8:
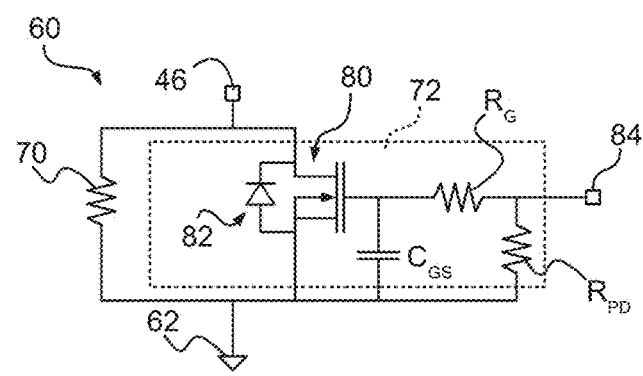

For instance, FIG. 8 is a circuit diagram exemplary of a possible implementation of the electronic switch 72 with an n-type MOS transistor 80 (comprising an intrinsic body diode 82, visible in FIG. 8 as a separate element for the sake of understanding only). The n-type MOS transistor 80 has a gate control terminal configured to receive an activation signal from a certain terminal 84, the terminal 84 being possibly coupled to an output pin $V_{REG}$ of the electronic control unit 30.

In one or more embodiments, activating (i.e., making conductive) the electronic switch 72 by means of an activation signal provided by the electronic control unit 30 may facilitate avoiding unwanted activations of the electronic switch 72 (e.g., activations when the ECU 30 is not operating in normal conditions).

In one or more embodiments, circuitry associated with the electronic switch 72 may comprise:
  a capacitance $C_{GS}$ coupled between the control terminal of the transistor 80 and the reference pin 62, in particular between the gate and source terminals of the transistor 80 in case the transistor 80 is a MOS transistor;
  a resistance $R_C$ coupled between the control terminal of the transistor 80 and the terminal 84 configured to receive the activation signal; and
  a resistance RPD coupled between the terminal 84 and the reference pin 62.

In one or more embodiments the high-impedance element 70 may be a resistor, e.g. a 47Ω resistor with a maximum power rating of 1 W, configured to limit the inrush current flowing through the ESD clamp circuit 40 as a result of a hot-plug event at any of pins Pin1, . . . , PinN.

In one or more embodiments, the transistor 80 may have a breakdown voltage between approximately 60 V and 100 V, and an on-resistance ($R_{DS\_ON}$) of approximately a few tens of mΩ, thereby providing a low-impedance current path between the pins 46 and 62 during normal operation of the ECU 30.

In one or more embodiments the capacitance $C_{GS}$ may be, for instance, a 47 nF capacitance with a maximum voltage rating of 16 V, configured to filter voltage spikes in the voltage $V_{DS}$ coupled to the gate of a MOS transistor 80 via the Miller parasitic capacitance of the transistor 80 during hot-plug events. Such capacitance $C_{GS}$ may thus facilitate keeping in a non-conductive state the low-impedance path (i.e., the transistor 80) during hot-plug events, e.g. preventing the transistor 80 from activating (i.e., becoming conductive) due to undesired charge coupled to its gate terminal as a result of the intrinsic Miller parasitic capacitance between drain and gate (not visible in FIG. 8). As a result of a voltage spike between the drain and the source of the transistor 80, a Miller current may flow through the series formed by the Miller parasitic capacitance (not visible in FIG. 8) and the gate-source capacitance $C_{GS}$. Selecting the value of the capacitance $C_{GS}$ (much) higher than the value of the Miller parasitic capacitance of the transistor 80, the gate-source voltage of the transistor 80 may be limited to a low value during the drain-source voltage spike resulting from a hot-plug transient. By keeping the gate-source voltage below the threshold value above which transistor 80 is turned on, conduction of transistor 80 during hot-plug events may be countered. As a result, a hot-plug current may be forced to flow through the high impedance path (e.g., the resistor 70) in the power limiting circuit 60.

In one or more embodiments, the capacitance $C_{GS}$ with the resistance $R_G$ may provide a delay-generating circuit network which may provide a propagation delay in the signal propagation path of the activation signal of the transistor 80 (e.g., the turn-on path of the transistor 80), thereby facilitating keeping the transistor 80 in a non-conductive state during hot-plug events.

In one or more embodiments the resistance $R_G$ may be, for instance, a 10 kΩ resistance with a maximum power rating of 0.1 W.

In one or more embodiments the resistance $R_{PD}$ may be, for instance, a 100 kΩ resistance with a maximum power rating of 0.1 W, configured to keep the transistor 80 in a non-conductive state when power supply of the electronic control unit 30 is removed.

It will be understood the values and ratings of the components 80, $R_G$, $C_{GS}$ and $R_{PD}$ illustrated above are given by way of example only.

Figure 9:
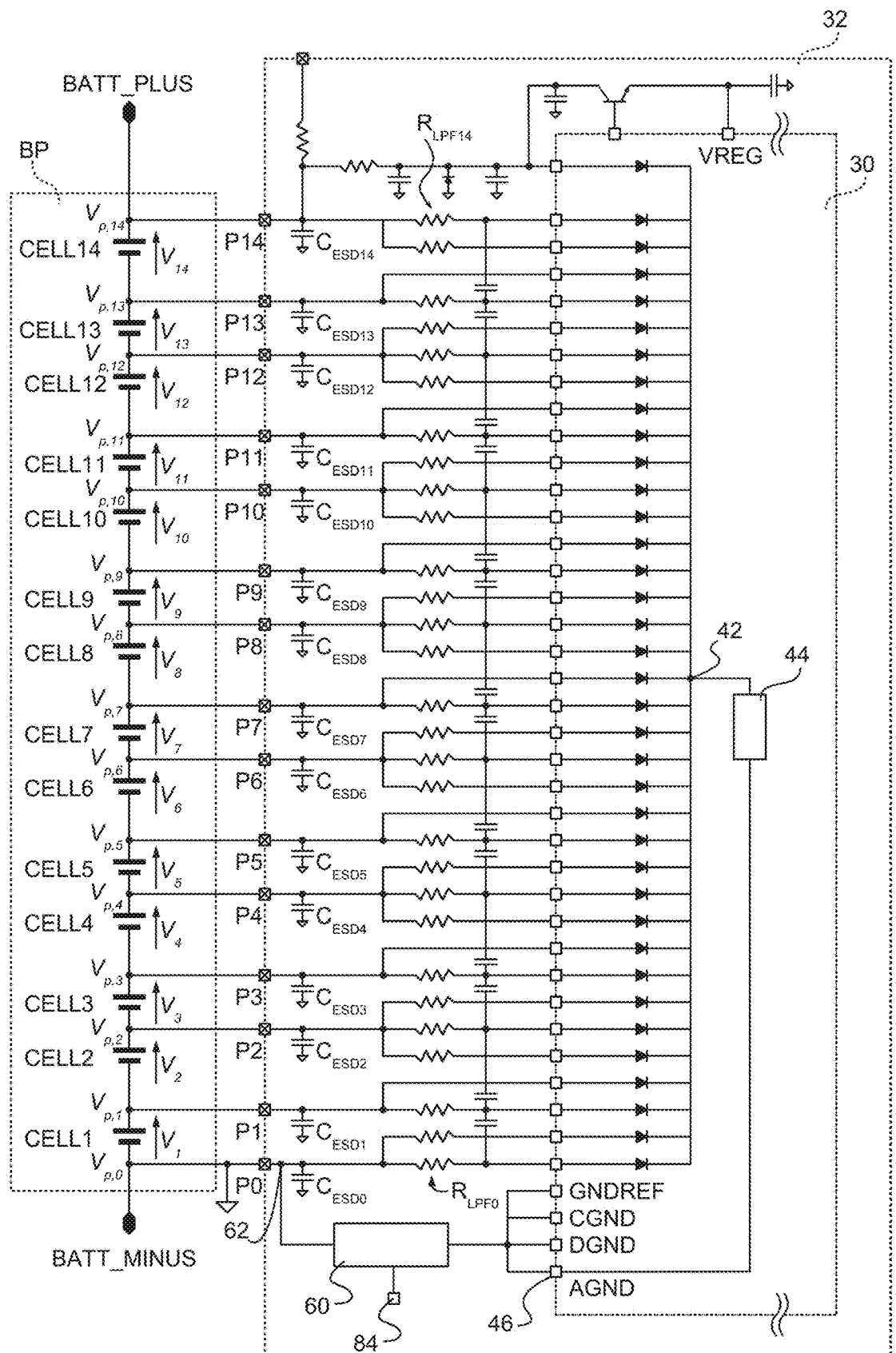
FIG. 9 is a circuit diagram exemplary of possible contexts of use of embodiments.

FIG. 9 is exemplary of one or more embodiments wherein an electronic control unit 30 is configured to manage a battery pack BP comprising a plurality of battery cells CELL1, . . . , CELL14. The electronic control unit 30 may be implemented as an integrated circuit having a plurality of input pins and/or output pins, the electronic control unit being mounted on a printed circuit board 32 having a respective plurality of input pins and/or output pins P0, . . . , P14.

In the case exemplified herein, the electronic control unit 30 may comprise an ESD clamp circuit as described in the present disclosure, particularly comprising a set of diodes coupled between the input pins of the ECU 30 and a common node 42 and clamping circuitry 44 coupled between the common node 42 and the output pin 46 (also labeled as AGND in FIG. 9).

Additionally, a power limiting circuit 60 may be mounted on or implemented on the PCB 32, coupled between the output pin 46 of the ECU and a reference pin 62 of the PCB. The reference pin 62 may be coupled, for instance, to the (negative) terminal BATT_MINUS of the battery pack BP. The power limiting circuit 60 may comprise a control terminal 84 configured to be coupled to an output pin $V_{REG}$ of the ECU, as exemplified in FIG. 9, the output pin $V_{REG}$ configured to provide a control (e.g., activation) signal for the power limiting circuit 60.

Therefore, by conveying the inrush power (e.g., inrush current) of hot-plug events to a set of pre-determined output pins 46 of the electronic control unit 30, one or more embodiments may provide solutions wherein a power limiting circuit may be placed in a contained area and coupled to said pre-determined output pins 46, thereby making unnecessary providing distributed external components (e.g., Zener diodes) on each possible inrush current path and lowering silicon area consumption and IC fabrication costs.

In one or more embodiments, possible inrush current paths due to hot-plug events may be pre-determined, thus facilitating providing robust IC architectures against a wide variety of power surges. For instance, one or more embodiments may facilitate providing nearly total hot-plug protection in respect to any possible cell connection sequence.

One or more embodiments may also provide scalable solutions, thus facilitating applying the hot-plug protection architecture disclosed herein to centralized battery management systems, wherein a single ECU is configured to manage battery packs comprising a plurality of modules coupled in series, e.g. in case high voltage levels are required.

Figure 10:
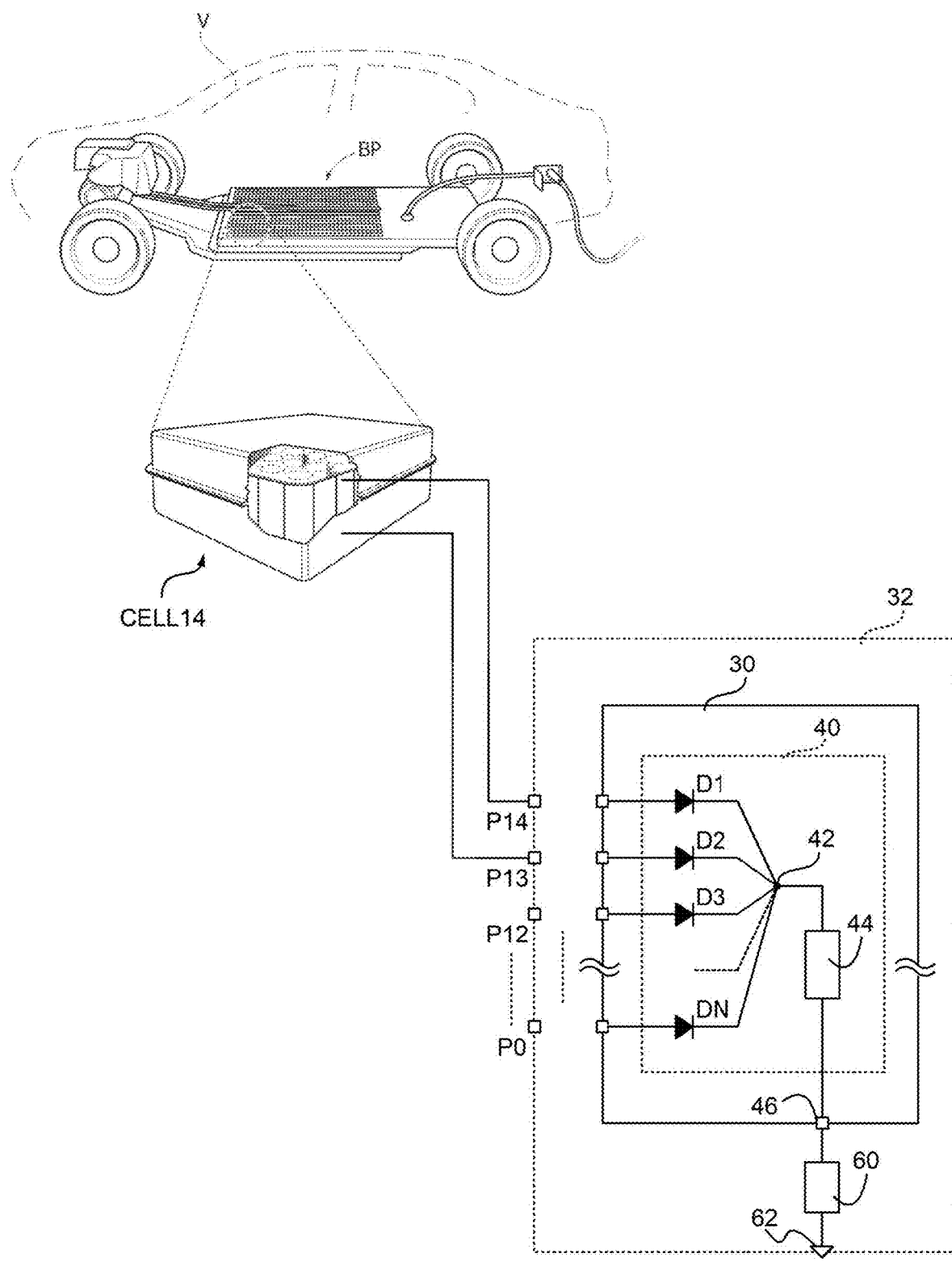
FIG. 10 is a block diagram exemplary of possible contexts of use of embodiments.

FIG. 10 is a block diagram exemplary of a possible arrangement of a battery pack BP equipping a vehicle V such as an electric vehicle (EV) or a hybrid electric vehicle (HEV) with an associated battery management system comprising an integrated circuit 30 on a PCB 32. A lithium battery pack may be exemplary of such a battery pack BP.

Reference to such a possible area of application and/or to such battery technology is not however to be understood in a limiting sense of embodiments, and reference to an "electronic control unit" which is made throughout this description should be understood as a reference to any kind of integrated circuit.

As exemplified in herein, for example in FIG. 6, an integrated circuit (e.g., 30) comprising a plurality of input pins (e.g., Pin1, . . . , PinN) and at least one output pin (e.g., 46) may include a hot-plug protection circuit (e.g., 4o), wherein the hot-plug protection circuit may comprise:
  a plurality of electrical connections, wherein the input pins in the plurality of input pins are electrically coupled to a common node (e.g., 42) in the hot-plug protection circuit via respective electrical connections in the plurality of electrical connections, and
  clamping circuitry (e.g., 44) coupled between the common node and the at least one output pin, the clamping circuitry activatable as a result of a voltage spike applied across the clamping circuitry.

As exemplified herein, for example in FIG. 6, the plurality of electrical connections and the clamping circuitry may provide respective current discharge paths between the input pins in the plurality of input pins and the at least one output pin, the respective current discharge paths configured to become conductive as a result of a voltage spike applied to any of said input pins in the plurality of input pins being transferred to the common node via the respective electrical connection in the plurality of electrical connections electrically coupling said any of said input pins to the common node.

As exemplified herein, for example in FIG. 6, the plurality of electrical connections coupling the input pins in the plurality of input pins to the common node in the hot-plug protection circuit may comprise respective diodes (e.g., D1, . . . , DN) coupled between the respective pins in the plurality of input pins and the common node.

As exemplified herein, for example in FIG. 5A, the clamping circuitry may comprise:
  a MOS transistor (e.g., 50) having a current path between the common node and the at least one output pin of the integrated circuit, and
  a Zener diode (e.g., 56) having the anode coupled to the source terminal of the MOS transistor and the cathode coupled to the gate terminal of the MOS transistor, the Zener diode being configured to clamp the gate-source voltage of the MOS transistor.

As exemplified herein, for example in FIG. 5A, the clamping circuitry may comprise a capacitance (e.g., 54) coupled between the common node and the gate terminal of the MOS transistor.

As exemplified herein, for example in FIG. 10, an integrated circuit including a hot-plug protection circuit may be configured as an electronic control unit of a battery management system for controlling a battery pack (e.g., BP).

As exemplified herein, for example in FIGS. 6 and 7, an electronic device may comprise:
  an integrated circuit according to one or more embodiments, and
  a power limiting circuit (e.g., 60) coupled between the at least one output pin of the integrated circuit and a reference pin (e.g., 62) and comprising a high-impedance current path (e.g., 70) between the at least one output pin of the integrated circuit and the reference pin.

As exemplified herein, for example in FIGS. 6 and 8, the power limiting circuit may comprise a low-impedance current path in parallel to the high-impedance current path, the low-impedance current path being activatable (e.g., 72) as a function of an activation signal, the activation signal being indicative of whether the integrated circuit operates in normal operating conditions or not.

As exemplified herein, for example in FIG. 8, the activation signal may be provided as an output signal (e.g., 84) of the integrated circuit.

As exemplified herein, for example in FIG. 8, an electronic device may comprise a delay-generating circuit network (e.g., CGS, RG) in a signal propagation path of the activation signal configured to delay propagation of the activation signal.

As exemplified herein, for example in FIG. 6, the integrated circuit may comprise an integrated circuit chip and the power limiting circuit may be provided external to the integrated circuit chip.

As exemplified herein, for example in FIG. 6, the electronic device may comprise a printed circuit board (e.g., 32) having the integrated circuit mounted thereon and comprising the power limiting circuit external to the integrated circuit, the power limiting circuit coupled between the at least one output pin of the integrated circuit and a reference pin (e.g., 62) of the printed circuit board.

As exemplified herein, for example in FIG. 10, an electronic device according to one or more embodiments may comprise an integrated circuit configured as an electronic control unit of a battery management system for controlling a battery pack.

As exemplified herein, for example in FIG. 10, an electrically powered vehicle (e.g., V) may comprise:
- a battery pack comprising a plurality of electrical battery cells (e.g., CELL1, . . . , CELL14),
- a battery management system coupled to the battery pack, and
- an integrated circuit according to one or more embodiments or an electronic device according to one or more embodiments configured to control the battery management system.

As exemplified herein, a method of providing hot-plug protection in an integrated circuit comprising a plurality of input pins and at least one output pin, the integrated circuit including a hot-plug protection circuit, may comprise:
- providing a plurality of electrical connections, wherein the input pins in the plurality of input pins are electrically coupled to a common node in the hot-plug protection circuit via respective electrical connections in the plurality of electrical connections, and
- arranging clamping circuitry coupled between the common node and the at least one output pin, the clamping circuitry activatable as a result of a voltage spike applied across the clamping circuitry,
- wherein the plurality of electrical connections and the clamping circuitry provide respective current discharge paths between the input pins in the plurality of input pins and the at least one output pin, the respective current discharge paths configured to become conductive as a result of a voltage spike applied to any of said input pins in the plurality of input pins being transferred to the common node via the respective electrical connection in the plurality of electrical connections electrically coupling said any of said input pins to the common node.

Without prejudice to the underlying principles, the details and embodiments may vary, even significantly, with respect to what has been described by way of example only, without departing from the extent of protection.

The extent of protection is defined by the annexed claims.

What is claimed is:

1. An integrated circuit comprising:
   a plurality of input pins; and
   at least one output pin, the integrated circuit including a hot-plug protection circuit, the hot-plug protection circuit comprising:
   a plurality of electrical connections, wherein input pins in the plurality of input pins are electrically coupled to a common node in the hot-plug protection circuit via respective electrical connections in the plurality of electrical connections;
   clamping circuitry coupled between the common node and the at least one output pin, the clamping circuitry being activatable as a result of a voltage spike applied across the clamping circuitry; and
   a power limiting circuit coupled between the at least one output pin of the integrated circuit and a reference pin and comprising an electronic switch coupled between the at least one output pin of the integrated circuit and the reference pin, and wherein the electronic switch comprises an MOS transistor, a capacitor coupled between a gate and a source of the MOS transistor, a first resistor coupled between the gate and a control terminal of the electronic switch, and a second resistor coupled between the source and the control terminal of the electronic switch, wherein a drain of the MOS transistor is directly coupled to the at least one output pin of the integrated circuit, and wherein the source of the MOS transistor is directly coupled to the reference pin,
   wherein the plurality of electrical connections and the clamping circuitry provide respective current discharge paths between the input pins in the plurality of input pins and the at least one output pin, the respective current discharge paths configured to become conductive as a result of a voltage spike applied to any of the input pins in the plurality of input pins being transferred to the common node via the respective electrical connection in the plurality of electrical connections electrically coupling any of the input pins to the common node.

2. The integrated circuit of claim 1, wherein the clamping circuitry comprises:
   a MOS transistor having a current path between the common node and the at least one output pin of the integrated circuit; and
   a Zener diode having an anode coupled to a source terminal of the MOS transistor and a cathode coupled to a gate terminal of the MOS transistor, the Zener diode being configured to clamp a gate-source voltage of the MOS transistor.

3. The integrated circuit of claim 2, comprising a capacitance coupled between the common node and the gate terminal of the MOS transistor.

4. The integrated circuit of claim 1, configured as an electronic control unit of a battery management system for controlling a battery pack.

5. An electrically powered vehicle, comprising:
   a battery pack comprising a plurality of electrical battery cells;
   a battery management system coupled to the battery pack; and
   an integrated circuit according to claim 4 configured to control the battery management system.

6. An electronic device, comprising:
   the integrated circuit according to claim 1; and
   the power limiting circuit coupled between the at least one output pin of the integrated circuit and the reference pin and comprising a high-impedance current path between the at least one output pin of the integrated circuit and the reference pin.

7. The electronic device of claim 6, wherein the power limiting circuit comprises a low-impedance current path in parallel to the high-impedance current path, the low-impedance current path being activatable as a function of an activation signal, the activation signal being indicative of whether the integrated circuit operates in normal operating conditions or not.

8. The electronic device of claim 7, wherein the activation signal is provided as an output signal of the integrated circuit.

9. The electronic device of claim 7, comprising a delay-generating circuit network in a signal propagation path of the activation signal, the delay-generating circuit network being configured to delay propagation of the activation signal.

10. The electronic device of claim 6, wherein the integrated circuit comprises an integrated circuit chip and the power limiting circuit is provided external to the integrated circuit chip.

11. The electronic device of claim 10, comprising a printed circuit board having the integrated circuit mounted thereon and comprising the power limiting circuit external to the integrated circuit, the power limiting circuit coupled between the at least one output pin of the integrated circuit and a reference pin of the printed circuit board.

12. The electronic device of claim 6, wherein the integrated circuit is configured as an electronic control unit of a battery management system for controlling a battery pack.

13. The integrated circuit of claim 1, wherein the plurality of electrical connections coupling the input pins in the plurality of input pins to the common node in the hot-plug protection circuit comprise only a single respective diode coupled between the respective pin in the plurality of input pins and the common node.

14. A method of providing hot-plug protection in an integrated circuit comprising a plurality of input pins and at least one output pin, the integrated circuit including a hot-plug protection circuit, wherein the method comprises:
providing a plurality of electrical connections, wherein input pins in the plurality of input pins are electrically coupled to a common node in the hot-plug protection circuit via respective electrical connections in the plurality of electrical connections;
arranging clamping circuitry coupled between the common node and the at least one output pin, the clamping circuitry being activatable as a result of a voltage spike applied across the clamping circuitry; and
coupling a power limiting circuit between the at least one output pin of the integrated circuit and a reference pin and comprising an electronic switch coupled between the at least one output pin of the integrated circuit and the reference pin, and wherein the electronic switch comprises an MOS transistor, a capacitor coupled between a gate and a source of the MOS transistor, a first resistor coupled between the gate and a control terminal of the electronic switch, and a second resistor coupled between the source and the control terminal of the electronic switch, wherein a drain of the MOS transistor is directly coupled to the at least one output pin of the integrated circuit, and wherein the source of the MOS transistor is directly coupled to the reference pin,
wherein the plurality of electrical connections and the clamping circuitry provide respective current discharge paths between the input pins in the plurality of input pins and the at least one output pin, the respective current discharge paths configured to become conductive as a result of a voltage spike applied to any of the input pins in the plurality of input pins being transferred to the common node via the respective electrical connection in the plurality of electrical connections electrically coupling any of the input pins to the common node.

15. The method of claim 14, comprising coupling the power limiting circuit between the at least one output pin of the integrated circuit and the reference pin, the power limiting circuit comprising a high-impedance current path between the at least one output pin of the integrated circuit and the reference pin.

16. An integrated circuit comprising a plurality of input pins and at least one output pin, the integrated circuit including a hot-plug protection circuit, wherein the hot-plug protection circuit comprises:
a plurality of electrical connections, wherein input pins in the plurality of input pins are electrically coupled to a common node in the hot-plug protection circuit via respective electrical connections in the plurality of electrical connections; and
clamping circuitry coupled between the common node and the at least one output pin, the clamping circuitry being activatable as a result of a voltage spike applied across the clamping circuitry,
wherein the plurality of electrical connections and the clamping circuitry provide respective current discharge paths between the input pins in the plurality of input pins and the at least one output pin, the respective current discharge paths configured to become conductive as a result of a voltage spike applied to any of the input pins in the plurality of input pins being transferred to the common node via the respective electrical connection in the plurality of electrical connections electrically coupling any of the input pins to the common node, and
a power limiting circuit coupled between the at least one output pin of the integrated circuit and a reference pin and comprising a high-impedance current path and an electronic switch coupled between the at least one output pin of the integrated circuit and the reference pin, wherein the power limiting circuit is configured to keep inrush power below a break-point of the clamping circuitry, and wherein the electronic switch comprises an MOS transistor, a capacitor coupled between a gate and a source of the MOS transistor, a first resistor coupled between the gate and a control terminal of the electronic switch, and a second resistor coupled between the source and the control terminal of the electronic switch, wherein a drain of the MOS transistor is directly coupled to the at least one output pin of the integrated circuit, and wherein the source of the MOS transistor is directly coupled to the reference pin, wherein the plurality of electrical connections coupling the input pins in the plurality of input pins to the common node in the hot-plug protection circuit comprise only a single respective diode coupled between the respective pin in the plurality of input pins and the common node.

17. The integrated circuit of claim 16, wherein the plurality of electrical connections coupling the input pins in the plurality of input pins to the common node in the hot-plug protection circuit comprise respective diodes coupled between the respective pins in the plurality of input pins and the common node.

18. The integrated circuit of claim 16, wherein the clamping circuitry comprises:
- a MOS transistor having a current path between the common node and the at least one output pin of the integrated circuit; and
- a Zener diode having an anode coupled to a source terminal of the MOS transistor and a cathode coupled to a gate terminal of the MOS transistor, the Zener diode being configured to clamp a gate-source voltage of the MOS transistor.

19. The integrated circuit of claim 18, comprising a capacitance coupled between the common node and the gate terminal of the MOS transistor.

20. The integrated circuit of claim 16, configured as an electronic control unit of a battery management system for controlling a battery pack.

\* \* \* \* \*